United States Patent
Peterson et al.

(10) Patent No.: US 12,469,868 B2
(45) Date of Patent: Nov. 11, 2025

(54) HYDROGEN-WATER SEPARATOR FOR FUEL CELL

(71) Applicant: FORD GLOBAL TECHNOLOGIES, LLC, Dearborn, MI (US)

(72) Inventors: Craig Peterson, West Bloomfield, MI (US); Matthew Riley, Ann Arbor, MI (US); Martin Pryor, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 875 days.

(21) Appl. No.: 17/669,905

(22) Filed: Feb. 11, 2022

(65) Prior Publication Data

US 2023/0261234 A1  Aug. 17, 2023

(51) Int. Cl.
| | |
|---|---|
| *H01M 8/22* | (2006.01) |
| *B04C 5/04* | (2006.01) |
| *B04C 5/13* | (2006.01) |
| *H01M 8/04082* | (2016.01) |

(52) U.S. Cl.
CPC ............... *H01M 8/22* (2013.01); *B04C 5/04* (2013.01); *B04C 5/13* (2013.01); *H01M 8/04201* (2013.01); *B04C 2005/136* (2013.01)

(58) Field of Classification Search
CPC ............ H01M 8/22; H01M 8/04201; H01M 8/04097; H01M 8/04164; B04C 5/04; B04C 5/13; B04C 2005/136; B04C 5/02; B04C 3/06; B04C 9/00; Y02E 60/50
See application file for complete search history.

(56) References Cited

U.S. PATENT DOCUMENTS

| | | | | |
|---|---|---|---|---|
| 1,256,766 | A * | 2/1918 | Behrendt et al. | B01D 29/23 210/451 |
| 3,633,832 | A * | 1/1972 | Fagerholt | B02C 17/04 241/176 |
| 8,323,840 | B2 | 12/2012 | Lee et al. | |
| 9,853,303 | B2 | 12/2017 | Peterson et al. | |
| 2003/0019363 | A1 * | 1/2003 | Grover | H01M 8/04291 429/444 |
| 2006/0226155 | A1 * | 10/2006 | Roche | F01M 13/04 220/563 |
| 2009/0023019 | A1 * | 1/2009 | Koenekamp | H01M 8/249 429/410 |
| 2014/0272631 | A1 * | 9/2014 | Sanderson | H01M 8/0687 429/414 |
| 2014/0377675 | A1 * | 12/2014 | Peterson | H01M 8/04097 429/414 |
| 2022/0347613 | A1 * | 11/2022 | Heinz | B01D 46/4263 |
| 2023/0372951 | A1 * | 11/2023 | Vanholme | B01D 53/26 |

FOREIGN PATENT DOCUMENTS

| | | |
|---|---|---|
| CN | 214956980 U | 11/2021 |
| CN | 214956982 U | 11/2021 |

* cited by examiner

*Primary Examiner* — Muhammad S Siddiquee
(74) *Attorney, Agent, or Firm* — David B Kelley; Brooks Kushman P.C.

(57) ABSTRACT

A hydrogen-water separator for a fuel cell includes an upper separation chamber having a first cylindrical sidewall defining an inlet port and a lower collection chamber configured to collect separated water. The collection chamber has a bottom and a second cylindrical sidewall defining a drain port disposed above the bottom. A divider is disposed between the separation chamber and the collection chamber. The divider spans the first cylindrical sidewall and defining one or more openings. An outlet tube is arranged vertically in the separation chamber and having an entrance that is disposed above the divider and below the inlet port.

16 Claims, 3 Drawing Sheets

HYDROGEN-WATER SEPARATOR FOR FUEL CELL

TECHNICAL FIELD

This disclosure relates to vehicles having a fuel cell power plant and more specifically to hydrogen-water separators.

BACKGROUND

The hydrogen fuel cell, and in particular the proton exchange membrane fuel cell (PEMFC), is one potential power source for automobiles and stationary applications. The reaction in a PEMFC involves hydrogen molecules splitting into hydrogen ions and electrons at the anode, while protons re-combine with oxygen and electrons to form water and release heat at the cathode. Typically, a proton exchange membrane is used as a proton conductor in a PEMFC. A catalyst layer containing, for example, platinum and/or a platinum alloy is used to catalyze the electrode reactions. A gas diffusion layer, which may include a microporous layer and a gas diffusion backing layer, is used to transport reactant gases and electrons as well as remove product water and heat.

SUMMARY

According to an embodiment, a hydrogen-water separator for a fuel cell includes an upper separation chamber having a first cylindrical sidewall defining an inlet port and a lower collection chamber configured to collect separated water. The collection chamber has a bottom and a second cylindrical sidewall defining a drain port disposed above the bottom. A divider is disposed between the separation chamber and the collection chamber. The divider spans the first cylindrical sidewall and defining one or more openings. An outlet tube is arranged vertically in the separation chamber and having an entrance that is disposed above the divider and below the inlet port.

According to another embodiment, a hydrogen-water separator for a fuel cell includes an upper housing having a top and a first cylindrical sidewall cooperating to define a separation chamber. An inlet port is arranged tangential to the first sidewall. An outlet tube is arranged vertically in the separation chamber and extending downwardly from the top and defining an entrance that is disposed below the inlet port. A lower housing has a bottom and a second cylindrical sidewall cooperating to define a collection chamber configured to collect separated water, wherein the second sidewall defines a drain port disposed higher than the bottom. An annular divider separating the separation chamber and the collection chamber and defining one or more openings allowing water to flow from the separation chamber to the collection chamber.

According to yet another embodiment, a fuel-cell system includes a hydrogen fuel cell defining hydrogen inlet and outlet ports. An ejector connected in fluid communication with the inlet port. A separator has an inlet conduit in fluid communication with the hydrogen outlet port and an outlet conduit in fluid communication with the ejector. The separator includes an upper separation chamber having a first cylindrical sidewall defining an exit of the inlet conduit, wherein the outlet conduit includes a tube arranged vertically in the separation chamber and having an entrance that is disposed below the exit of the inlet conduit. And includes a lower collection chamber configured to collect separated water, wherein the collection chamber has a bottom and a second cylindrical sidewall defining a drain port disposed above the bottom. A divider is disposed between the separation chamber and the collection chamber, the divider spanning the first cylindrical sidewall and defining one or more openings.

DETAILED DESCRIPTION

Figure 1:
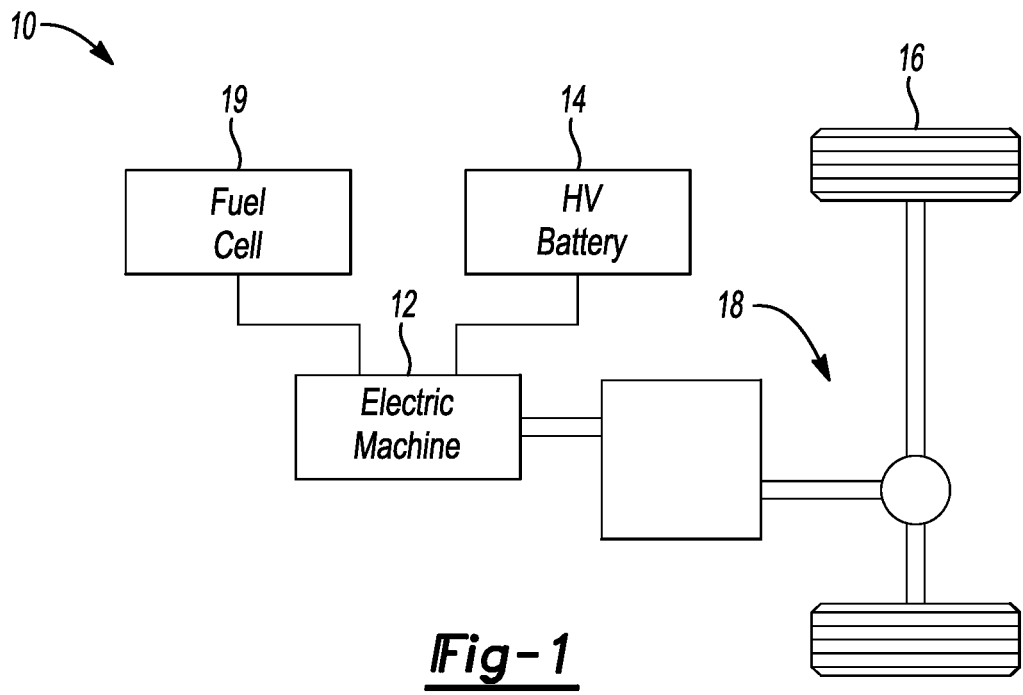
FIG. 1 is a schematic diagram of a fuel-cell vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

PEMFC are a popular fuel cell choice for automotive vehicles. The PEMFC generally includes a proton exchange membrane (PEM). The anode and the cathode typically include finely divided catalytic particles, usually platinum, supported on carbon particles and mixed with an ionomer. The catalytic mixture is deposited on opposing sides of the membrane. The combination of the anode-catalytic mixture, the cathode-catalytic mixture, and the PEM form a coated catalyst membrane electrode (CCM). In order to facilitate the transport of reactant gases to and remove the excessive water and heat from the catalytic mixture, a gas diffusion layer (GDL), which may include a microporous layer and a carbon-fiber-based gas diffusion backing layer, may be applied on either side of the CCM to form a membrane electrode assembly (MEA). GDLs also provide mechanical support for the soft goods including the PEM and catalytic mixtures.

MEAs are sandwiched between bipolar plates to form unit cells. The bipolar plates typically include an anode side and a cathode side. Anode fuel flow channels are provided on the anode side of the bipolar plates that allow the anode gas to flow to the anode side of the MEA. Cathode oxidant flow channels are provided on the cathode side of the bipolar plates that allow the cathode gas to flow to the cathode side of the MEA. Coolant channels may be disposed between the anode and cathode sides of the bipolar plates to thermally regulate the fuel cell.

Several unit cells are typically combined in a fuel-cell stack to generate the desired power. For example, the stack may include two-hundred or more unit cells arranged in series. The fuel-cell stack receives a cathode reacting gas, typically a flow of air forced through the stack by a compressor. Not all the oxygen is consumed by the stack and some of the air is output as a cathode exhaust gas that may include water as a stack byproduct. The fuel-cell stack also receives an anode hydrogen reacting gas that flows into the anode side of the stack.

Referring to FIG. 1, a vehicle 10 includes a fuel-cell system 19 for providing electrical power to at least one electric machine 12. The vehicle 10 may also include a traction battery 14 electrically connected to the fuel-cell system 19 and the electric machine 12. The electric machine 12 is connected to the driven wheels 16 via a drivetrain 18. During operation of the vehicle 10, hydrogen fuel and air are fed into a fuel cell of the system 19 creating electrical power. The electric machine 12 receives the electrical power as an input, and outputs torque for driving the wheels 16 to propel the vehicle 10.

Figure 2:
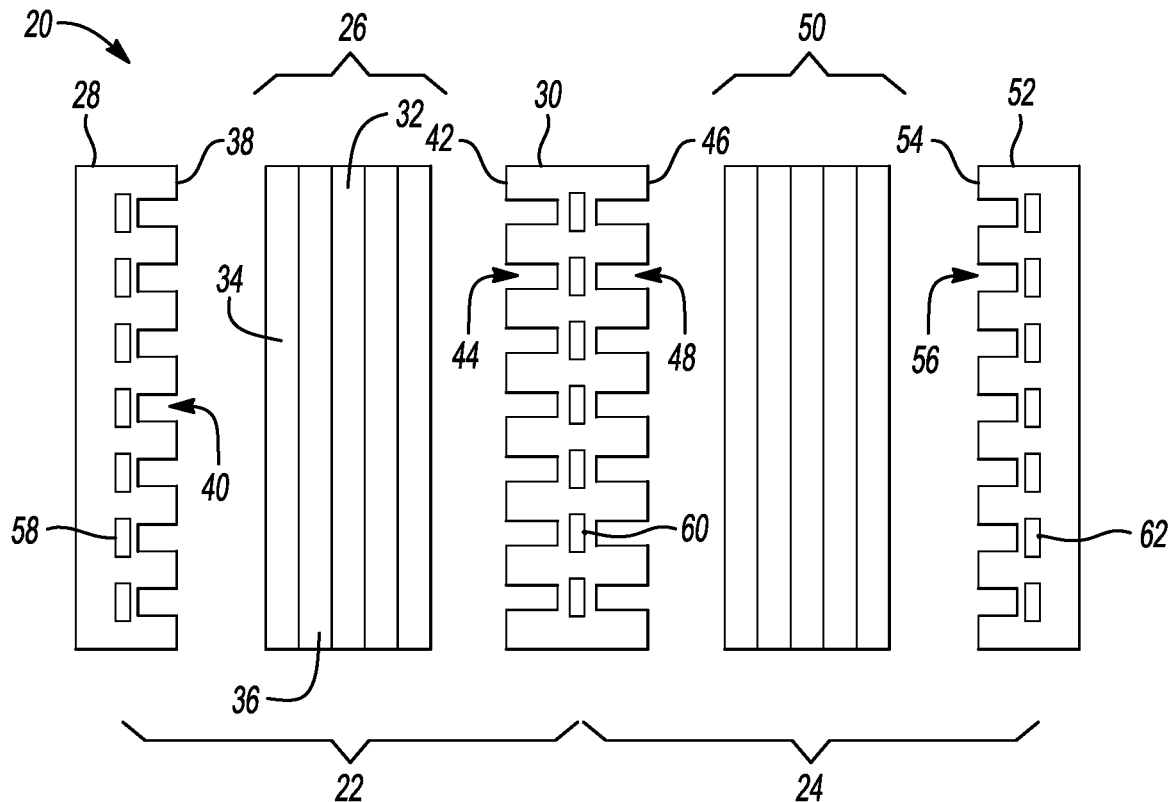
FIG. 2 is an exploded view of a proton exchange membrane fuel-cell stack.

Referring to FIG. 2, an example fuel cell 20 of the system 19 includes two unit cells 22, 24 stacked together. The two-cell stack is merely an example and the fuel cell 20 may include dozens or hundreds of stacked unit cells. The first unit cell 22 includes an MEA 26 sandwiched between a first end plate 28 and a bipolar plate 30. The MEA 26 is comprised of a plurality of different layers including a PEM 32, a pair of gas diffusion layers (GDL) 34 and a pair of catalyst layers 36. The endplate 28 includes an anode side 38 defining a plurality of flow paths 40 for the hydrogen fuel. The bipolar plate 30 includes a cathode side 42 defining a plurality of flow paths 44 for air and an anode side 46 defining a plurality of flow paths 48 for hydrogen fuel for the second unit cell 24. A second MEA 50 is sandwiched between the bipolar plate 30 and a last endplate 52. The last endplate 52 includes a cathode side 54 defining a plurality of flow paths 56 for air. The coolant channels 58, 60, 62 are configured to circulate coolant, such as ethylene glycol.

Figure 3:
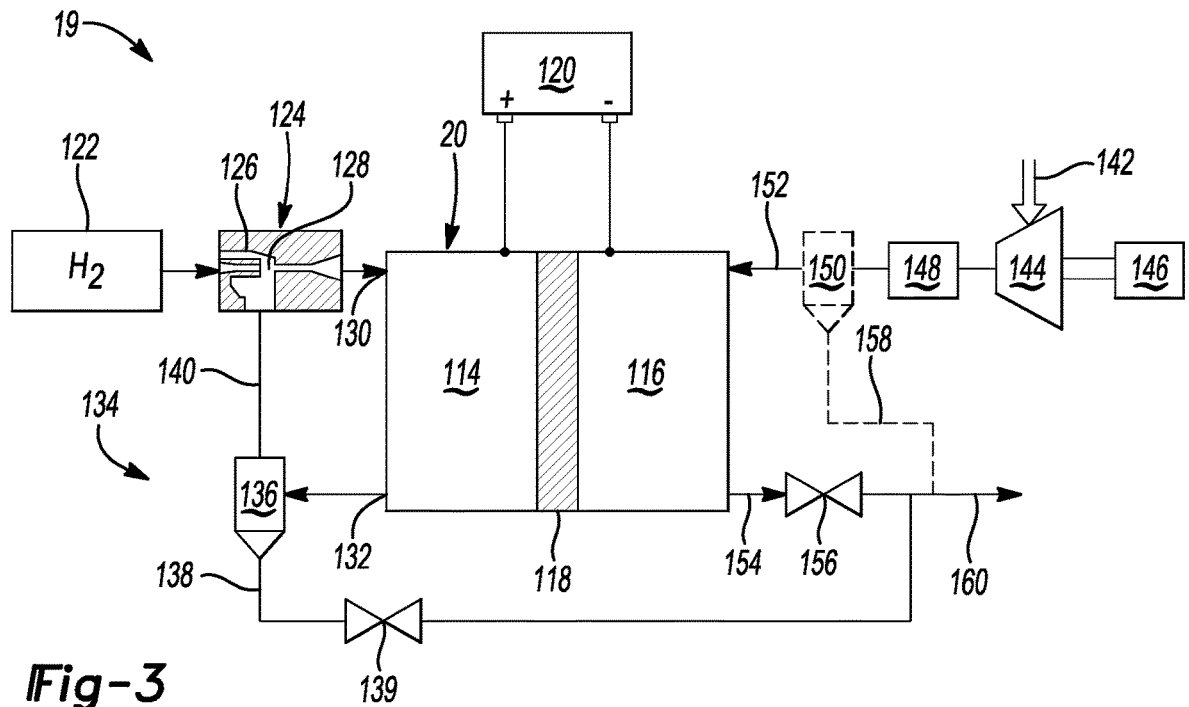
FIG. 3 is a schematic diagram of a fuel-cell system.

Referring to FIG. 3, the fuel-cell system 19 includes the fuel cell or fuel-cell stack 20. The stack 20 contains an anode side 114, a cathode side 116, and a membrane 118 therebetween. The fuel-cell system 19 electrically communicates with and provides energy, for example, to a high-voltage bus 120 or a traction battery. The fuel-cell stack 20 may also have a cooling loop (not shown).

During operation of the fuel-cell system 19, product water, residual fuel such as hydrogen, and byproducts such as nitrogen, may accumulate at the anode side 114 of the fuel-cell stack 20. Attempts have been made to remove the liquid product water and byproducts and to reuse the residual hydrogen and water vapor. One approach is to collect those constituents in a separator 136 downstream of the fuel-cell stack 20, separate at least a portion of the liquid water and/or nitrogen, and return the remaining constituents to the fuel-cell stack 20 via a return passageway in a recirculation loop.

A primary fuel source 122 is connected to the anode side 114 of the fuel-cell stack 20, such as a primary hydrogen source. Non-limiting examples of the primary hydrogen source 122 are a high-pressure hydrogen storage tank or a hydride storage device. The hydrogen source 122 is connected to one or more ejectors 124. The ejector 124 has a nozzle 126 supplying hydrogen into the converging section of a converging-diverging nozzle 128. The diverging section of the nozzle 128 is connected to the input 130 of the anode side 114.

The output 132 of the anode side 114 is connected to a passive recirculation loop 134. Typically, an excess of hydrogen gas is provided to the anode side 114 to ensure that there is sufficient hydrogen available to all of the cells in the stack 20. In other words, hydrogen is provided to the fuel-cell stack 20 above a stoichiometric ratio of one, i.e., at a fuel rich ratio relative to exact electrochemical needs. The recirculation loop 134 is provided such that excess hydrogen unused by the anode side 114 is returned to the input 130 so may be used and not wasted.

Additionally, accumulated liquid and vapor phase water is an output of the anode side 114. The anode side 114 requires humidification for efficient chemical conversion and to extend membrane life. The recirculation loop 134 may be used to provide water to humidify the hydrogen gas before the input 130 of the anode side 114.

The recirculation loop 134 contains a hydrogen-water separator 136, or water knock-out device. The separator 136 receives a stream or fluid mixture of hydrogen gas, nitrogen gas, and water from the output 132 of the anode side 114. The water may be mixed phase and contain both liquid- and vapor-phase water. The separator 136 removes at least a portion of the liquid-phase water, which exits the separator through drain line 138. At least a portion of the nitrogen gas, hydrogen gas, and vapor-phase water may also exit the drain line 138, and pass through a control valve 139 (purge valve), for example, during a purge process of the fuel-cell stack 20. The remainder of the fluid in the separator 136 exits through passageway 140 in the recirculation loop 134, which is connected to the ejector 124. The fluid in passageway 140 is fed into the converging section of the converging-diverging nozzle 128 where it mixes with incoming hydrogen from the nozzle 126 and hydrogen source 122.

Liquid water may be removed from the anode side 114 by the separator 136 to prevent water blockages within the channels and cells of the anode side 114. Water blockages within the fuel-cell stack 20 may lead to decreases in cell voltage and/or voltage instabilities within the fuel-cell stack 20. Liquid water may also be removed by the separator 136 to prevent a blockage or partial blockage within the ejector 124. A liquid water droplet in the diverging section of the converging-diverging nozzle 128 would effectively create a second venturi section within the nozzle 128 and lead to pumping instabilities for the ejector 124.

The cathode side 116 of the stack 20 receives oxygen, for example, as a constituent in an air source 142. In one embodiment, a compressor 144 is driven by a motor 146 to pressurize the incoming oxygen. The pressurized air is then humidified by a humidifier 148 before entering the cathode side 116. Another separator 150 (shown in phantom) may be positioned downstream of the humidifier 148. The separator 150 may be used to remove liquid water from the humidified air flow before it enters the cathode side 116 of the stack 20 at input 152. Water droplets may be present downstream of the humidifier 148 due to liquid water being entrained by air high flow rates within the humidifier 148. Liquid water may be removed by the separator 150 to prevent water blockages within the cells of the cathode side 116, leading to decreases in cell voltage and/or instabilities within the fuel-cell stack 20. The output 154 of the cathode side 116 is connected to a valve 156. Drain line 138 from separator 136, and a drain line 158 from separator 150 may be connected to a line 160 downstream of the valve 156. In other embodiments, the drain lines may be plumbed to other locations in the fuel-cell system 19.

Other system architectures may also be used for the fuel-cell system 19. For example, a turbine may be used in addition to the compressor 144 to induce flow through the cathode side 16. In one example, a turbine is positioned downstream of the cathode stack outlet 154, with a separator interposed between the cathode side 116 and the turbine to remove liquid water before the fluid stream enters the turbine.

Based on the use of the ejector 124 to create flow through the anode side 114 and induce flow through the passive recirculation loop 134, the ejector 124 must overcome any pressure drops in the system, which includes a typically significant pressure drop across the fuel-cell stack 20. The system 19 as shown does not include a pump or other device to induce flow in the recirculation loop 134, therefore all the compression work must be accomplished by the ejector, otherwise described as a jet pump. To enable this function, the separator 136 needs to have a low pressure drop across it. The separator 136 also needs to remove larger droplets of water from the fluid to prevent water blockages in the recirculating flow in the fuel-cell stack 20 or ejector 124 caused by droplets. The separator 136 permits vapor phase water and smaller water droplets to remain in the recirculating flow in passageway 140 and return to the ejector 124 for humidification purposes. In one example, the separator 136 removes water droplets having a diameter on the order of one millimeter or larger.

Additionally, as separator 136 receives fluid flow from the anode side 114, the separator 136 needs to be designed for use with hydrogen gas. Generally, hydrogen gas may cause material degradation or embrittlement issues and material used in the separator 136 need to be hydrogen compatible. Additionally, hydrogen is a small molecule, and many conventional separator devices are not suitable for use with hydrogen because their design may permit leaks, for example, with a conventional threaded connection. Other conventional separators may contain rotating or moving parts, such as a rotating vane, or the like, which may not be compatible with hydrogen as the lubricant may poison the fuel-cell stack 20, or the hydrogen may degrade or decompose the lubricant.

Separator 150 also needs to remove larger droplets of water from the fluid to prevent water blockages caused by droplets in the flow in the cathode side 116 of the fuel-cell stack 20. The separator 150 permits vapor phase water, and smaller water droplets to remain in the flow for humidification. In one embodiment, the separator 150 removes water droplets that are the same size or larger than the cathode side 116 flow field channel widths. In one example, the cathode side flow field channels are 0.2-1.0 millimeters.

Figure 4:
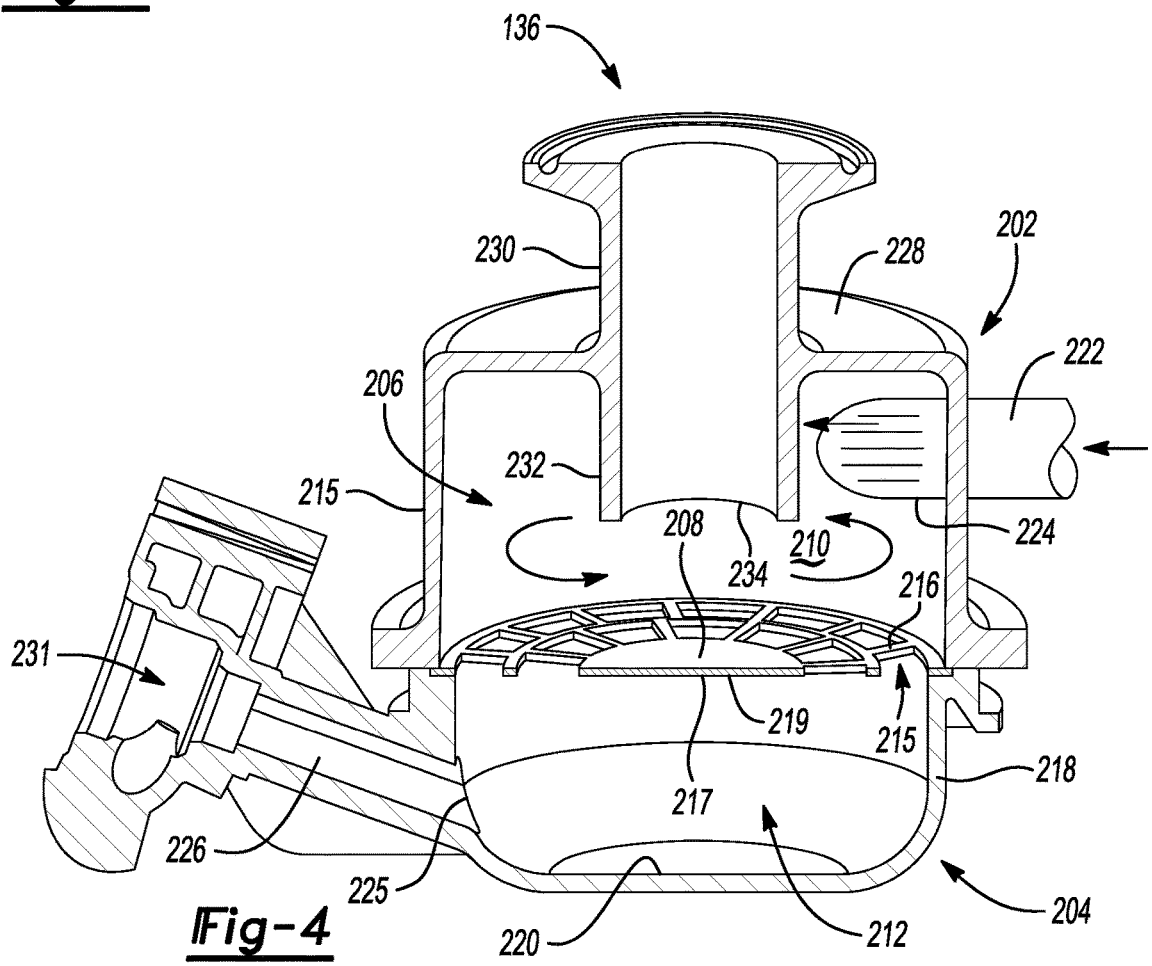
FIG. 4 is a cross-sectional side view of a hydrogen-water separator of the fuel-cell system.
Figure 5:
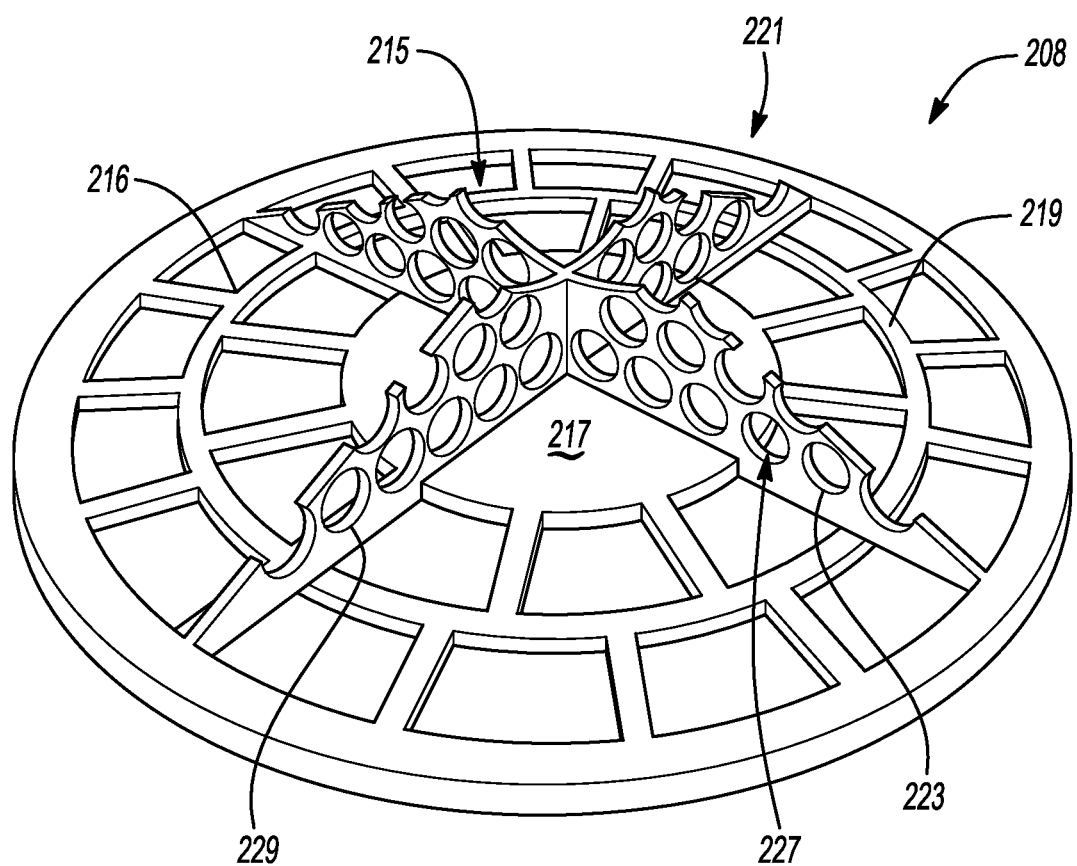
FIG. 5 is a perspective view of a divider of a hydrogen-water separator shown in an upside-down orientation for illustrative purposes.

Referring to FIGS. 4 and 5, the separator 136 has an upper portion 202 and a lower portion 204. The upper and lower portions define an internal chamber 206. A divider 208 divides the chamber 206 into an upper vortex or separation chamber 210 and a lower collection chamber 212. The divider 208 may include a screen 216. The screen 216 may be a larger mesh size and made of a material having a low contact angle to prevent liquid from sheeting on the screen 216, and allow the liquid to drip down into the collection chamber 212. In one embodiment, the contact angle of the screen 216 is less than ninety degrees, and in a further embodiment is less than fifty degrees. The screen 216 may have openings 215 of between 8 to 10 mm allowing water to easily pass through the screen. This larger opening 215 allow more gas flow to the bottom and also allow water to be re-entrained. The screen 216 may include a solid center 217. The solid center 217 is circumscribed by the openings 215. The solid center 217 blocks water from being re-entrained in the outlet (recirculation exit) 230. The diameter of the solid center 217 may be greater than or equal to the diameter of the outlet tube 230.

The divider 208 may also include optional baffles. For example, lower baffles 221 depend downwardly from a lower side 219. The baffles 221 may include a first baffle 223 and a second baffle 229 that intersect at the center point of the divider 208. The first and second baffles 223, 229 may be arranged perpendicular to each other. One or more of the baffles may define openings 227. The height or depth of the baffles 221 may be greatest at the center point and gradually reduce towards the outer diameter of the screen. Alternatively, the baffles may be rectangular with a constant depth or height. The baffles 221 reduced turbulence in the collection chamber 112 and help prevent the re-entrainment of water through the outlet or recirculation exit 230 of the separator 136.

The lower portion 204 has a generally cylindrical or bowl shape. The lower portion 204 defines a cylindrical side wall 218 and a bottom 220. The side wall 218 and bottom 220 may be integrally formed, as shown. In other embodiments, the side wall 218 may be tapered into a frustoconical shape, conical shape, or another suitable shape. The bottom 220 may be planar with rounded transition into the cylindrical side wall 218.

The collection chamber 212 may be sized to collect and store liquid water. The collection chamber 212 of the lower portion 204 may be reduced in volume up to just before the point where circulating fluid in the vortex chamber 210 causes splashing of liquid from the collection chamber 212 to the vortex chamber 210 through the divider 208.

The separator 136 has an inlet port or conduit 222. The inlet conduit 222 is tangentially connected to the side wall 215 such that fluid flowing through the inlet conduit 222 enters the chamber 206 to flow smoothly along the side wall 215 without any turns imposed by the geometry of the connection between the inlet conduit 222 and separator housing. At the entrance point 224 where the fluid enters the chamber 210 from the inlet conduit 222, the fluid is flowing generally parallel with the side wall 218.

The lower portion 204 also has a drain port 225 and conduit 226. The drain port 225 is positioned in the wall 218 and above the bottom 220. The conduit 226 extends from the drain port 225 at an upward angle so that water does not sit in the conduit and instead drains to the bowl or lower portion 212 of the separator 136. This reverse pitch of the conduit 226 in conjunction with the bottom 220 being lower than the drain port 225 ensures that water does not sit in the purge valve and instead is stored in the bottom portion 212 of the water separator 136 where the water/ice has room to expand during freezing. The drain conduit 226 extends from the drain port 225 to a valve chamber 231 that houses the purge valve (not shown). The lower housing portion 204 of the separator may define the valve chamber 227 and the drain conduit 226 as part of an integrally formed component.

The drain port 225 may be sized such that liquid water cannot bridge or sheet across the opening. The drain port 225 may also be made from a low contact angle material to prevent liquid sheeting across the opening.

The upper portion 202 has a top or end wall 228 that supports the outlet conduit or tube 230. The outlet conduit 230 is connected to the upper portion 202 such that it extends generally perpendicularly from the top 228 where it is attached. In other embodiments, the connection angle between the outlet conduit 230 and the top 228 may vary. The outlet conduit 230 has a section of tubing 232 that extends into the chamber 206 such that an entrance 234 to the outlet conduit 230 from the chamber 206 is spaced apart from the divider 208.

The tubing 232 of the outlet conduit 230 extends into the chamber 206 from the end wall 228. The tubing 232 is nested with the side wall 215 to form a channel therewith. The tubing 232 has a generally cylindrical shape.

In one embodiment, the inlet exit 224 is positioned adjacent to an upper edge of the upper portion 202 such that it is adjacent to the top of the separator 136. The inlet conduit 222 is positioned at a higher elevation than the end 234 of the tubing 232 to induce and retain swirl and prevent the fluid flow from shortcutting across the chamber 206.

The outlet conduit 230 shares a common longitudinal axis with the separator 136, such that the side wall 218 and the outlet conduit 230 are coaxial with one another. In the embodiment shown, axis (A) of the inlet conduit 222 is perpendicular to axis (B) of the outlet tube 230. In other embodiments, the positioning of axis A with respect to the separator 136 and axis B may be varied, for example, such that flow is introduced into the chamber generally tangentially to the side wall 215 and also with a downward flow component. The axes are spaced apart from one another such that they do not intersect. For a vehicle or fuel-cell application, the inlet and outlet conduits do not need to be positioned along a common axis, or in-line with one another, as is done in many conventional, thereby allowing for improved packaging of the separator 136 into available space.

During operation, the fluid stream from the anode 114 enters the separator 136 though the inlet conduit 222, and contains hydrogen gas, nitrogen gas, water vapor, and liquid water. The fluid enters the chamber 210 generally parallel or tangential to the side wall 218, which reduces the overall pressure drop across the separator. The side wall 218 of the chamber 210 and the tube 232 act to guide the fluid in the chamber 210 in a channel that forms between them. The fluid is spun in the chamber 210 about the tube 232, as shown by arrows, to remove liquid entrained in the fluid stream. Centripetal acceleration created by the rotational fluid flow causes the liquid droplets to move to the wall 218. The droplets impact the wall 218 and then gravity causes the liquid to run down the wall 218 and into the collection chamber 212. The remaining fluid, which includes hydrogen gas, nitrogen gas, water vapor, and smaller water droplets continue to spin within the separator 136. The smaller water droplets continue to spin or rotate with the fluid flow as their mass is insufficient for the centrifugal forces acting on them to cause them to move to and impact the wall 218.

After entering the chamber 210 from the inlet conduit 222, the fluid turns 90 degrees in order to flow towards the outlet conduit 230. This 90-degree turn may be gradual, with the fluid flow path in a helical pattern or spiral pattern. The entrance 234 to the outlet conduit 130 is spaced apart from and faces generally away from the inlet conduit 222. The entrance 234 is also spaced apart from the wall 218 and located generally in the center of the separator 136. In order to exit the chamber 210 to tubing 232, the fluid turns 180-degrees, which provides for additional separation of entrained water droplets from the fluid stream. The geometry of the separator 136 causes the fluid stream to make the 180-degree turn as well as separate away from the wall, as shown by the arrows in FIG. 4 in order to reach the entrance 234 of the outlet conduit 230. Liquid droplets above a certain size are separated from the fluid flow as they cannot follow this turn due to their momentum, and these droplets make their way to the collection chamber 212. The fluid flow has a generally unobstructed, uninterrupted flow path between the inlet conduit 222 and the outlet conduit 230, which decreases the pressure drop across the separator 136.

Momentum of the liquid droplets and forces caused by centripetal acceleration causes the droplets to continue on a straight path to the outer wall 218 of the separator 136. The gas portion of the fluid stream has a much lower density and is able to turn and flow with the curvature of the chamber 206. The initial turn of the fluid stream after the entrance region 224 causes the first stage of liquid water separation, and the water that impacts the wall 218 flows down the sides 218 and into the collection chamber 212 below. As the fluid starts to move in a circular or helical motion around the vertical axis 236 of the separator 136, it expands into the larger volume in the chamber 210 and the fluid stream velocity decreases. The fluid stream is forced to turn ninety degrees downward toward the entrance 234 of the outlet conduit 230. The fluid stream is then forced by the separator geometry to make a second turn of 180 degrees and accelerate back up to approximately its original speed as it enters the outlet conduit 230, assuming the outlet 230 diameter is approximately the same as the inlet diameter 222. Liquid water droplets in the fluid stream are flung downwards into the separation screen 216 and the collection chamber 212 during the initial portion of the 180-degree turn as their momentum is too large for them to follow the flow streamline and so their flow trajectory causes inertial impaction with the separator 136 and separation from the fluid stream. Only low-density gases or very small droplets are able to follow the fluid streamline and make this second tight turn that is also against gravitational forces to flow into the outlet conduit 230. Any liquid water droplets that make this turn are so finely dispersed that they should be able to be vaporized upon mixing in the ejector 124.

The screen 216 of the divider 208 creates a location for condensation to occur and also provides a flow-smoothing effect for fluid rotating in the vortex chamber 210. The screen 216 also acts to maintain a relatively calm environment within the collection chamber 212, and prevent fluid motion such as splashing into the upper chamber 210. The collection chamber 212 beneath the screen 216 collects liquid water and directs it to the drain conduit 226.

During soak of the fuel cell, for example, at fuel cell startup or prior to startup, and during system operation, the separator 136 may be used in order to remove water from the anode loop of the fuel cell. Additionally, excess nitrogen may be removed from the anode side 114 of the fuel cell during a purge process. When the concentration or partial pressure of nitrogen in the anode side 114 of the fuel cell is too high, the performance of the fuel cell 20 decreases as there is an insufficient concentration of hydrogen, or the partial pressure of hydrogen is too low. By purging the anode side 114 of the fuel cell, the excess nitrogen is flushed out of the anode side 114 of the stack 20. The mixture of hydrogen, excess nitrogen, and liquid and vapor phase water enters the separator 136 during the purge process. The separator 136 causes liquid water, excess nitrogen, and a portion of the hydrogen to exit the drain line 226 of the separator. Some hydrogen and other constituents in the flow may be returned through the outlet conduit 230 of the separator to the ejector 124. The ejector 124 also may not perform well in the presence of high concentrations of nitrogen, as the density of nitrogen is higher than that of hydrogen. Therefore, by removing excess nitrogen from the anode side 114 of the fuel cell during a purge process, overall fuel cell performance may be increased.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hydrogen-water separator for a fuel cell comprising:
   an upper separation chamber having a first cylindrical sidewall defining an inlet port;
   a lower collection chamber configured to collect separated water, the collection chamber having a bottom and a second cylindrical sidewall defining a drain port disposed above the bottom;
   a divider disposed between the separation chamber and the collection chamber, the divider spanning the first cylindrical sidewall and defining one or more openings; and
   an outlet tube arranged vertically in the separation chamber and having an entrance that is disposed above the divider and below the inlet port,
   wherein the divider includes a solid center disk circumscribed by the one or more openings.

2. The hydrogen-water separator of claim 1, wherein the inlet port is arranged tangential to the sidewall.

3. The hydrogen-water separator of claim 1, wherein the divider is annular.

4. The hydrogen-water separator of claim 1 further comprising a drain conduit extending from the drain port, wherein the drain conduit slopes towards the drain port such that water within the drain conduit gravity flows to the collection chamber.

5. The hydrogen-water separator of claim 1, wherein the upper separation chamber has a top and the outlet tube extends through the top.

6. The hydrogen-water separator of claim 1, wherein the one or more openings are at least 8 millimeters wide.

7. A hydrogen-water separator for a fuel cell comprising:
   an upper separation chamber having a first cylindrical sidewall defining an inlet port;
   a lower collection chamber configured to collect separated water, the collection chamber having a bottom and a second cylindrical sidewall defining a drain port disposed above the bottom;
   a divider disposed between the separation chamber and the collection chamber, the divider spanning the first cylindrical sidewall and defining one or more openings; and
   an outlet tube arranged vertically in the separation chamber and having an entrance that is disposed above the divider and below the inlet port,
   wherein the divider includes an upper side and a lower side, and the divider further includes a baffle depending from the lower side.

8. The hydrogen-water separator of claim 7, wherein the baffle defines a plurality of openings.

9. The hydrogen-water separator of claim 7, wherein the baffle is elongate and is arranged radial to the divider.

10. The hydrogen-water separator of claim 9, wherein the divider further includes a second baffle depending from the lower side.

11. The hydrogen-water separator of claim 10, wherein the baffle and the second baffle intersect at a center point of the divider.

12. The hydrogen-water separator of claim 7, wherein a height of the baffle is tallest at a center of the divider.

13. The hydrogen-water separator of claim 7, wherein the divider includes a solid center disk.

14. A hydrogen-water separator for a fuel cell comprising:
   an upper housing having a top and a first cylindrical sidewall cooperating to define a separation chamber;
   an inlet port arranged tangential to the first sidewall;
   an outlet tube arranged vertically in the separation chamber and extending downwardly from the top and defining an entrance that is disposed below the inlet port;
   a lower housing having a bottom and a second cylindrical sidewall cooperating to define a collection chamber configured to collect separated water, wherein the second sidewall defines a drain port disposed higher than the bottom; and
   an annular divider separating the separation chamber and the collection chamber and defining one or more openings allowing water to flow from the separation chamber to the collection chamber, wherein the divider includes an upper side and a lower side, and the divider includes a baffle depending from the lower side, wherein the baffle is elongate and is arranged radial to the divider.

15. The hydrogen-water separator of claim 14, wherein the divider includes a solid center disk circumscribed by the one or more openings.

16. The hydrogen-water separator of claim 14 further comprising a drain conduit extending from the drain port, wherein the drain conduit slopes towards the drain port such that water within the drain conduit gravity flows to the collection chamber.

* * * * *